Figure 3:
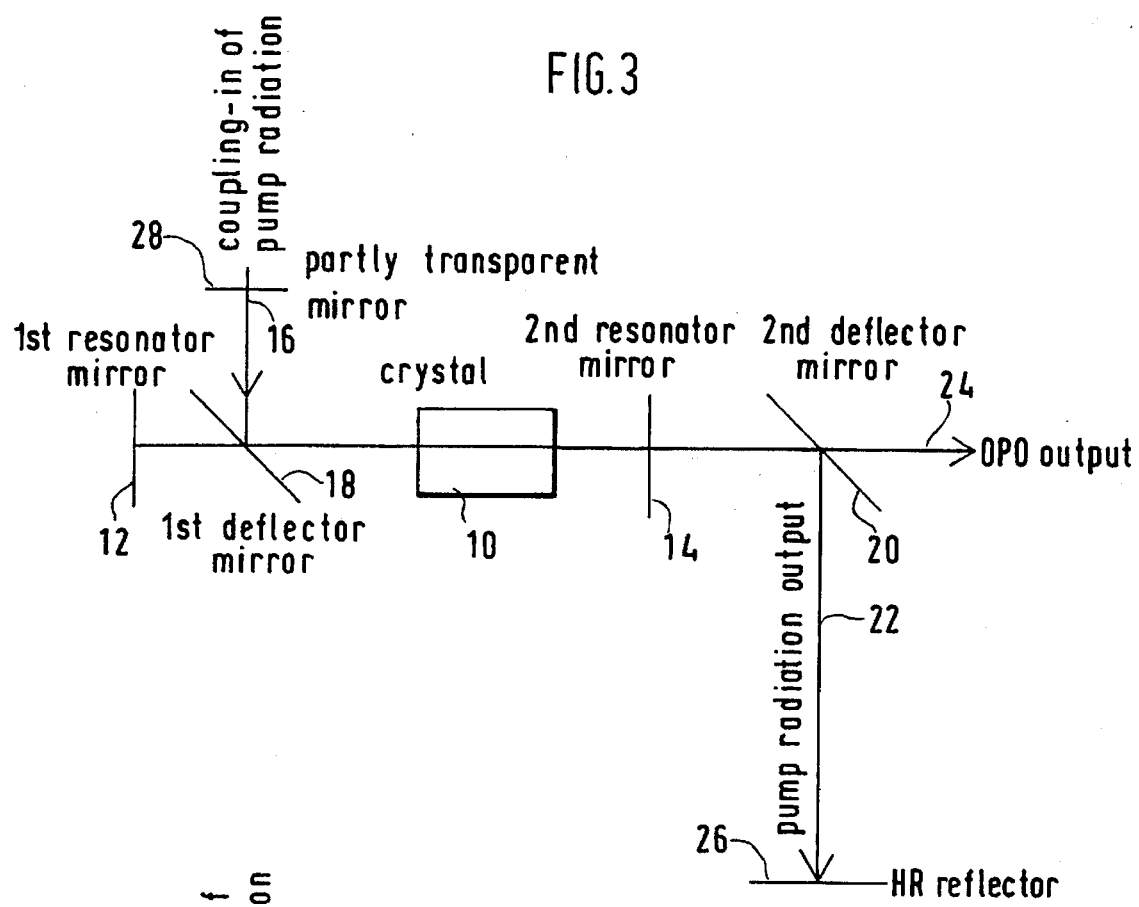

United States Patent
Stamm et al.

[11] Patent Number: 5,661,595
[45] Date of Patent: Aug. 26, 1997

[54] TUNABLE, OPTICAL PARAMETRIC OSCILLATOR

[75] Inventors: Uwe Stamm, Göttingen; Peter Lokai, Bovenden; Vadim Berger, Göttingen; Stefan Borneis, Fulda, all of Germany

[73] Assignee: Lambda Physik Gesellschaft zur Herstellung Von Lasern mbH, Germany

[21] Appl. No.: 626,505

[22] Filed: Apr. 2, 1996

[30] Foreign Application Priority Data

Apr. 6, 1995 [DE] Germany .................. 195 12 984.9

[51] Int. Cl.$^6$ .................................................. G02F 1/39
[52] U.S. Cl. ........................... 359/330; 359/326; 372/22
[58] Field of Search ................................. 359/326, 330; 372/21, 22

[56] References Cited

U.S. PATENT DOCUMENTS

| | | | |
|---|---|---|---|
| 5,033,057 | 7/1991 | Bosenberg et al. | 372/72 |
| 5,047,668 | 9/1991 | Rosenberg | 359/330 |
| 5,053,641 | 10/1991 | Cheng et al. | 359/330 |
| 5,276,548 | 1/1994 | Margalith | 359/330 |
| 5,390,211 | 2/1995 | Clark et al. | 372/95 |
| 5,406,409 | 4/1995 | Harlamoff et al. | 359/330 |
| 5,477,378 | 12/1995 | Johnson | 359/326 |

FOREIGN PATENT DOCUMENTS

| | | | |
|---|---|---|---|
| 44 00 095 A1 | 1/1994 | Germany | G02F 1/39 |

OTHER PUBLICATIONS

"Visible BaB$_2$O$_4$ optical parametric oscillator pumped at 355 nm by a single-axial-mode pulsed source". Y.X. Fan, R.C. Eckardt and R.L. Byer; J. Nolting and R. Wallenstein; Received 9 Jun. 1988; accepted for publication 12 Sep. 1988; Appl. Phys. Lett. 53(21), Nov. 1988, p. 2014.

"Average-power scaling for ultraviolet-pumped β-barium borate and lithium triborate optical parametric oscillators", vol. 10, No. 9/Sep. 1993/J. Opt.Soc.Am.B, pp. 1751-1757; Hiroshi Komine; received Feb. 16, 1993; revised manuscript received Apr. 19, 1993.

The Optical Parametric Oscillators of Beta-Bariumborate and Lithiumborate: New Sources of Powerful Tunable Laser Radiation in the Ultraviolet, Visible and Near Infrared; A. Fix, T. Schröder, and R. Wallenstein, Fachbereich Physik; received Apr. 13, 1991; p. 106, *Laser und Optoelektronik* 23(3), 1991.

"Optical Parametric Oscillator Threshold and Linewidth Studies", *IEEE Journal of Quantum Electronics*, vol. QE-15, No. 6, Jun. 1979; Stephen J. Brosnan and Robert L. Byer; pp. 415-431.

A reprint from Journal of the *Optical Society of America B* "Tunable β-Barium borate optical parametric oscillator: operating characteristics with and without injection seeding"; A. Fix, T. Schröder, and R. Wallenstein; J. G. Haub, M. J. Johnson, and B.J. Orr; received Dec. 30, 1992; p. 1744.

*J. Opt. Soc. Am. B*/ vol. 10, No. 9/Sep. 1993 "Broadly tunable, single-frequency optical parametric frequency-conversion system"; W.R. Bosenberg and Dean R. Guyer; received Nov. 3, 1992; revised manuscript received Feb. 9, 1993; p. 1716.

*Primary Examiner*—John D. Lee
*Attorney, Agent, or Firm*—Limbach & Limbach L.L.P.

[57] ABSTRACT

A tunable, optical, parametric oscillator including at least one non-linear optical crystal (10) comprises a first deflector mirror (18) arranged inside the resonator between the resonator mirror (12) and the crystal (10) to couple in the pump radiation (16) as well as a second deflector mirror (20) arranged outside the resonator behind a second resonator mirror (14) to separate the pump radiation (22) from the radiation (24) generated in the optical parametric oscillator.

9 Claims, 2 Drawing Sheets

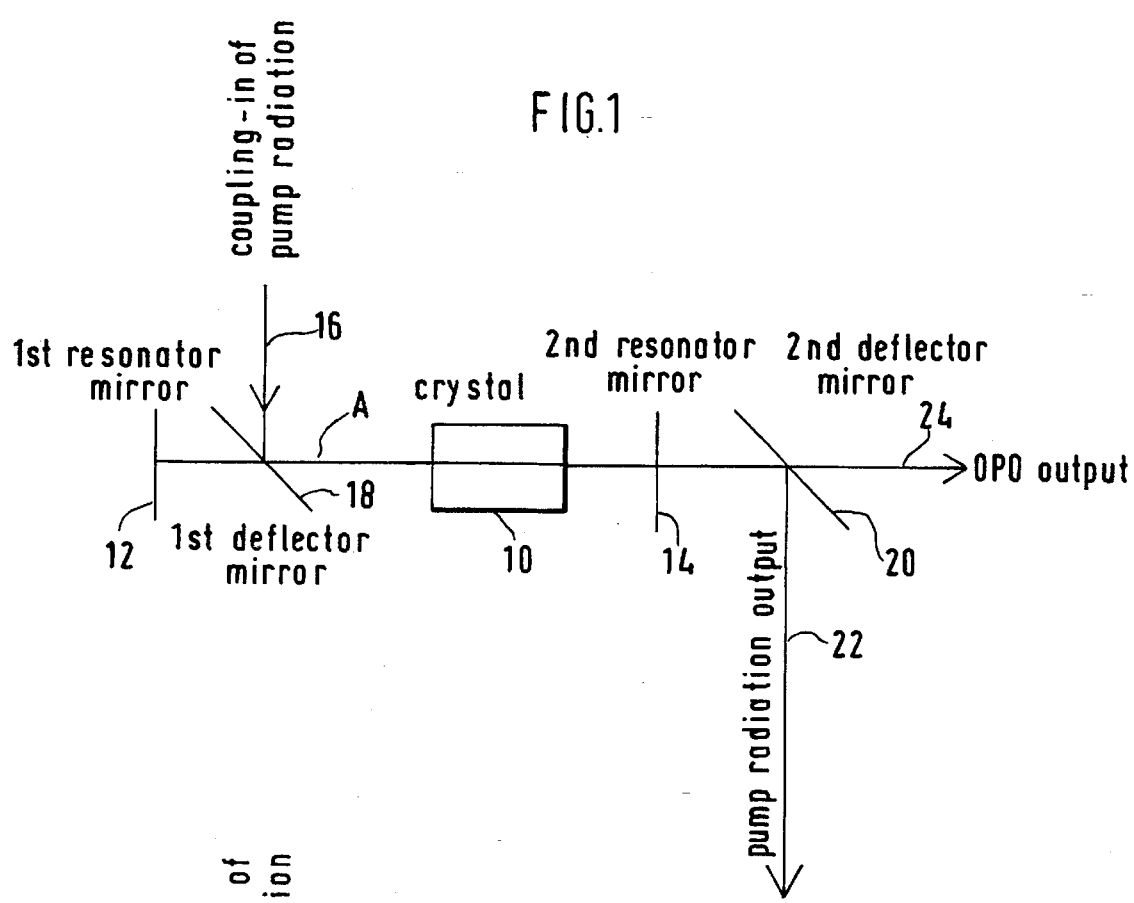
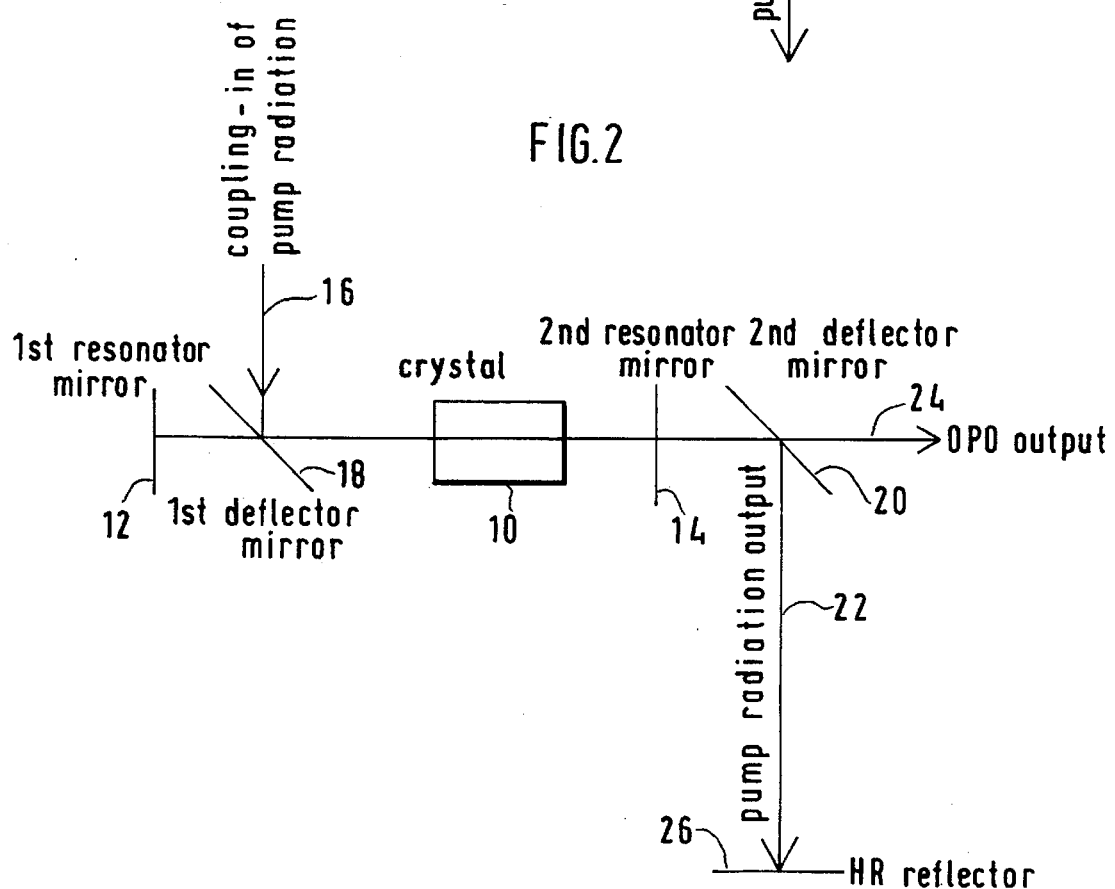

TUNABLE, OPTICAL PARAMETRIC OSCILLATOR

The instant invention relates to a tunable, optical, parametric oscillator (OPO) including at least one optically non-linear crystal which is mounted in an optical resonator. An OPO of this kind is a source of coherent radiation.

Such a tunable OPO is known, for example, from the following U.S. Pat. Nos. 5,053,641; 5,033,057; 5,047,668 or from the German publication DE 42 19 169 A1.

As regards prior art, reference is also made to the following articles published by Y. X. Fan et al., Appl. Phys. Lett. 53, p. 2014 (1988), A. Fix et al., Laser und optoelektronik 23, p. 106 (1991), H. Komine, Journal Opt. Soc. Am. B 10, p. 1751 (1993), W. R. Rosenberg et al., Journal Opt. Soc. Am. B 10, p. 1716 (1993), and A. Fix et al., Journal Opt. Soc. Am. B 10, p. 1744 (1993).

The prior art known from U.S. Pat. No. 5,053,641 quoted above presents a laser arrangement for generating tunable coherent radiation by means of an optical parametric oscillator which makes use of a BBO crystal ($\beta$-$BaB_2O_4$) in the resonator. The pumping beam is focussed through one of the two resonator mirrors into the non-linear crystal. Tuning of the wavelength of the output radiation is achieved by way of rotating the crystal about an axis which is perpendicular to the optical axis of the resonator.

According to U.S. Pat. No. 5,033,057 the arrangement was modified in such a way as to locate two mirrors in the resonator of the OPO, for coupling in and out the pump radiation. DE 44 00 095 A1 and U.S. Pat. No. 5,276,548 likewise describe OPO arrangements which have the mirrors for coupling in and out disposed within the resonator.

The paper by H. Komine, Journal Opt. Soc. Am. B 10, page 1751 (1993) describes an OPO wherein a mirror which is highly reflective for the pump radiation and reflects the pumping beam in itself is arranged downstream of the mirror inside the OPO resonator coupling out the pump radiation from the resonator.

The arrangement described in U.S. Pat. No. 5,053,641 has the disadvantage of requiring resonator mirrors for the OPO which are extremely resistant to the pump radiation, and at least one resonator mirror which is highly transmissive for the pump radiation so as to be able to accomplish efficient coupling-in of the pumping beam. This requirement causes great problems with the mirrors in question for OPOs because the tunability of OPO mirrors makes it necessary for them to provide high reflection over a wide range of wavelengths (e.g. from 400 nm to 700 nm signal wavelength range of a BBO OPO pumped at the frequency-tripled radiation of an Nd:YAG laser). Multi-layer mirror systems are needed to guarantee that, and their threshold of destruction becomes lower as the number of layers grows.

This disadvantage is eliminated with the modified OPO arrangement specified in U.S. Pat. No. 5,033,057. Yet this is achieved at the expense of efficiency in transforming the pump performance into OPO output performance because the overall losses are greater due to the greater resonator length caused by the two mirrors which are provided for coupling in and out the pump radiation and are both mounted at an angle in the resonator. That is demonstrated, for example, for pulsatingly pumped OPOs with which the pumping intensity needed to reach the oscillation threshold is directly proportional to the square of the resonator length (see e.g. the paper by S. J. Brosnan, R. L. Byer, IEEE J. Quant. Electron. QE-15, page 415 (1979)).

The arrangement described by H. Komine in Journal Opt. Soc. Am. B 10, p. 1751 (1993) diminishes the loss in efficiency by passing the pump radiation once more through the crystal, whereby the non-linearly optical crystal is excited twice.

In the prior art, so far, the following considerations were decisive in devising tunable optical parametric oscillators:

In those cases where resonator mirrors could withstand the necessary power density of the pump radiation, both resonator mirrors were located directly, in other words as close as possible to the OPO crystal in order to achieve maximum efficiency of the oscillator.

In those cases where the resonator mirrors do not resist the power density required of the pump radiation, the prior art provides for arranging both the mirrors for coupling in and coupling out the pump radiation directly within the OPO resonator.

The state of the art exclusively teaches the two alternatives mentioned above, depending on the respective circumstances.

It is the object of the instant invention to improve a tunable, optical, parametric oscillator in such a way that, on the one hand, the demands are reduced as to the radiation resistance the mirrors must display to the pump radiation and, on the other hand, the efficiency of conversion of pump power into OPO output performance is increased.

This object is met, in accordance with the invention, in that a first deflector mirror is arranged inside the resonator between the first resonator mirror and the non-linear optical crystal to couple in the pump radiation, and a second deflector mirror is arranged outside the resonator behind a second resonator mirror to separate the pump radiation from the radiation generated in the optical parametric oscillator.

Thus it is an important feature of the invention that only one deflector mirror for the pump radiation is located inside the OPO resonator.

The advantages achieved by the invention as compared to the prior art, above all, are a lower oscillation threshold and, accordingly, improved efficiency, more OPO output at the same pumping power, less stressing of the optical elements and, therefore, a longer service life of the optical elements and, finally, also simpler adjustment of the OPO resonator.

According to a preferred embodiment of the invention a member which reflects the pump radiation in itself is provided downstream of the second deflector mirror for separation of the pump radiation from the radiation generated in the opticial parametric oscillator. The double excitation of the non-linear optical crystal thus obtained increases the efficiency of transformation of pumping light into tunable radiation.

According to another preferred embodiment of the invention a partly transparent mirror is disposed in the pump radiation path upstream of the first deflector mirror for coupling in the pump radiation. Together with the member located downstream of the second deflector mirror for separating the pump radiation from the radiation generated in the optical parametric oscillator, the partly transparent mirror forms an optical resonator for the pump radiation. The field superelevation in this resonator is responsible for a further improvement in efficiency.

Other preferred embodiments of the invention are recited in the other dependent claims.

As will be seen, the requirement as to radiation resistance of the OPO resonator mirrors is reduced, thanks to the invention, because the pump radiation does not pass through one of the OPO resonator mirrors. Furthermore, as a result of the shorter resonator length made possible by the separation of the pumping light from the generated OPO output radiation outside of the resonator, the threshold of the OPO is lowered, whereby stable optical parametric oscillation becomes possible at lower pumping intensities so that the second OPO mirror is subjected to less radiation load and the efficiency rises.

The efficiency of the arrangement is increased still further due to the fact that the pump radiation is fed back.

Figure 4:
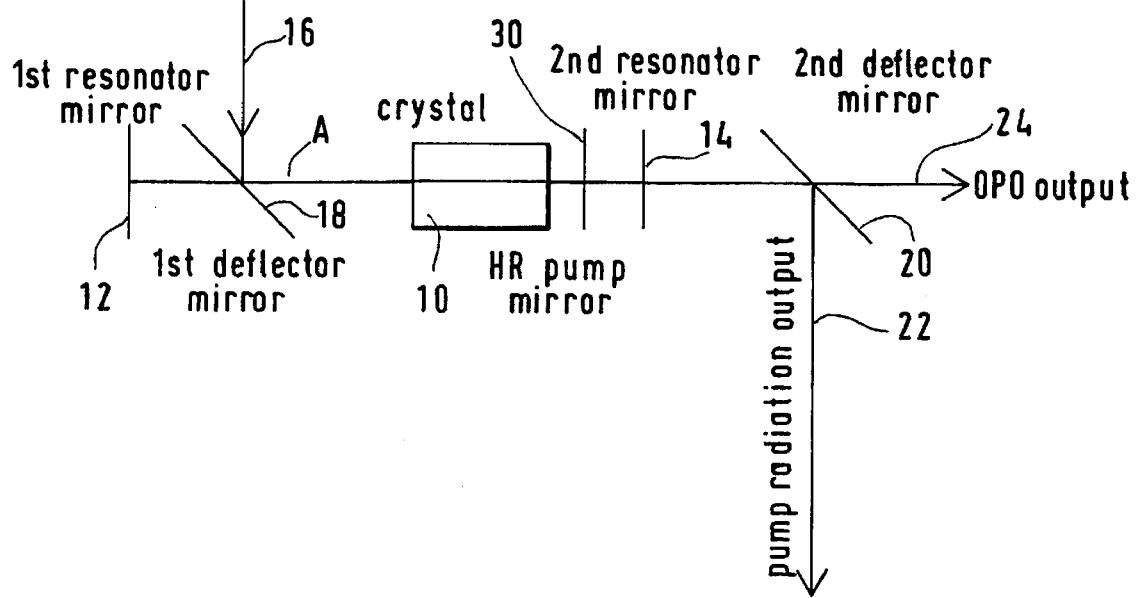

Embodiments of the invention will be described in greater detail below, with reference to the accompanying drawings, in which:

FIG. 1 is a diagrammatic presentation of a first embodiment of an optical parametric oscillator (OPO); and FIGS. 2 to 4 show further embodiments of OPOs.

Components serving the same functions are marked by the same reference numerals throughout the figures.

In a first embodiment of an optical parametric oscillator an optical non-linear crystal 10 is arranged within a resonator comprising a first resonator mirror 12 and a second resonator mirror 14.

The crystal 10 is pumped in per se known manner by means of pump radiation 16.

As shown in the figures, the pump radiation 16 is coupled into the resonator by a first deflector mirror 18. The first deflector mirror 18 preferably is mounted at the Brewster angle with respect to the optical axis A of the resonator for the resonated OPO radiation.

In the assembly, the crystal 10 is followed directly by the second resonator mirror 14. Radiation issuing from the resonator through the second resonator mirror 14 impinges on a second deflector mirror 20 which is designed to separate the output radiation 24 of the optical parametric oscillator from the pump radiation 22. The second deflector mirror for the pump radiation preferably is disposed at the Brewster angle for the OPO output radiation.

The above arrangement of the optical components has a number of advantages:

First of all, the radiation resistance specification of the resonator mirrors 12, 14 of the optical parametric oscillator is reduced due to the fact that the pump radiation does not pass through one of the two resonator mirrors (the first resonator mirror 12 in the instant case). In the figures, the pump radiation entering the OPO is designated 16, while the pump radiation exiting from the OPO is marked 22. Separating the pump radiation from the output radiation 24 generated by means of the OPO, outside of the resonator, has the advantage that the resonator length can be shortened, whereby the threshold of the OPO may drop. That in turn permits stable optical parametric oscillation to be obtained at lower intensities of pump radiation already so that also the radiation loading is diminished to which the second resonator mirror 14 is subjected, and the efficiency of the OPO is increased.

FIG. 2 illustrates a further development of the embodiment of the embodiment shown in FIG. 1. With the embodiment according to FIG. 2 the pump radiation 22 exiting from the OPO is reflected in itself with the aid of an optical member 26. This optical member is a highly reflective mirror (HR reflector) in the embodiment of FIG. 2.

The efficiency of the arrangement on the whole is improved as the radiation 22 is returned into the OPO resonator. This is so because the non-linear optical crystal is excited several times. Improved efficiency of the OPO means that a greater proportion of the pump radiation is converted into tunable OPO radiation 24.

FIG. 3 illustrates an embodiment which is a further developmemnt of the embodiment according to FIG. 2. Here, the pump radiation 16 entering the OPO passes through a partly transparent mirror 28 before it is incident on the first deflector mirror 18. Together with the reflecting optical member 26 disposed downstream of the second deflector mirror 20, the partly transparent mirror 28 forms an optical resonator for the pump radiation (not to be confused with the OPO resonator made up of mirrors 12 and 14). This resonator for the pump radiation, composed of mirrors 26 and 28, results in field superelevation of the pump radiation in the crystal 10 and, therefore, is responsible for further improvement of the efficiency of the OPO.

FIG. 4 shows an embodiment where another mirror 30 is provided between the crystal 10 and the second resonator mirror 14 to reflect the pump radiation 16 such that it returns in itself, i.e. into the crystal 10, whereby the efficiency is improved still further.

The wavelength of the radiation 24 issued by the OPO is tuned, as is known per se, in that the optical non-linear crystal 10 is tilted more or less with respect to the optical axis A of the OPO resonator. According to a preferred modification of the embodiments described above, the second deflector mirror 20 is rotated in synchronism with the crystal 10 and the thickness of the second deflector mirror 20 is selected in such a way that the radiation displacement, due to the crystal rotation, occurring in the beam as it exits from the OPO is compensated upon passage of the deflector mirror. This means that the exiting radiation 24 will always have the same position in space, regardless of the adjusted angle of rotation of the crystal.

What is claimed is:

1. A tunable, optical, parametric oscillator comprising at least one non-linear optical crystal (10) disposed in an optical resonator, characterized in that a first deflector mirror (18) is arranged inside the resonator between a first resonator mirror (12) and the non-linear optical crystal (10) to couple in the pump radiation (16) and a second deflector mirror (20) is arranged outside the resonator behind a second resonator mirror (14) to separate the pump radiation (22) from the radiation (24) generated in the optical parametric oscillator.

2. The tunable, optical, parametric oscillator as claimed in claim 1, characterized in that at least one of the two deflector mirrors for the pump radiation (16) is arranged at the Brewster angle with respect to the optical axis (A) of the resonator.

3. The tunable, optical, parametric oscillator as claimed in claim 1, characterized in that a member (26) which reflects the pump radiation in itself is arranged downstream of the second deflector mirror (20) which separates the pump radiation from the radiation (24) generated in the optical parametric oscillator.

4. The tunable, optical, parametric oscillator as claimed in claim 3, characterized in that the reflecting member (26) located downstream of the second deflector mirror (20) is a mirror.

5. The tunable, optical, parametric oscillator as claimed in claim 3, characterized in that the reflecting member (26) located downstream of the second deflector mirror (20) is a phase conjugating mirror.

6. The tunable, optical, parametric oscillator as claimed in claim 3, characterized in that the reflecting member (26) located downstream of the second deflector mirror (20) is a triple prism.

7. The tunable, optical, parametric oscillator as claimed in claim 3, characterized in that a partly transparent mirror (28) is arranged in the pump radiation path upstream of the first deflector mirror (18) which serves to couple in the pump radiation.

8. The tunable, optical, parametric oscillator as claimed in claim 1, characterized in that another mirror (30) is arranged between the non-linear optical crystal (10) and the second resonator mirror (14) to reflect the pump radiation in itself.

9. The tunable, optical, parametric oscillator as claimed in claim 1, characterized in that the second deflector mirror (20) for the pump radiation is rotated in synchronism with the non-linear optical crystal and the thickness of this deflector mirror is selected such that the beam displacement of the OPO output beam occurring upon rotation of the crystal is compensated upon passage of the deflector mirror.

* * * * *